SETH BARNUM.
Improvement in Wagon Shaft Coupling.
No. 119,494. Patented Oct. 3, 1871.
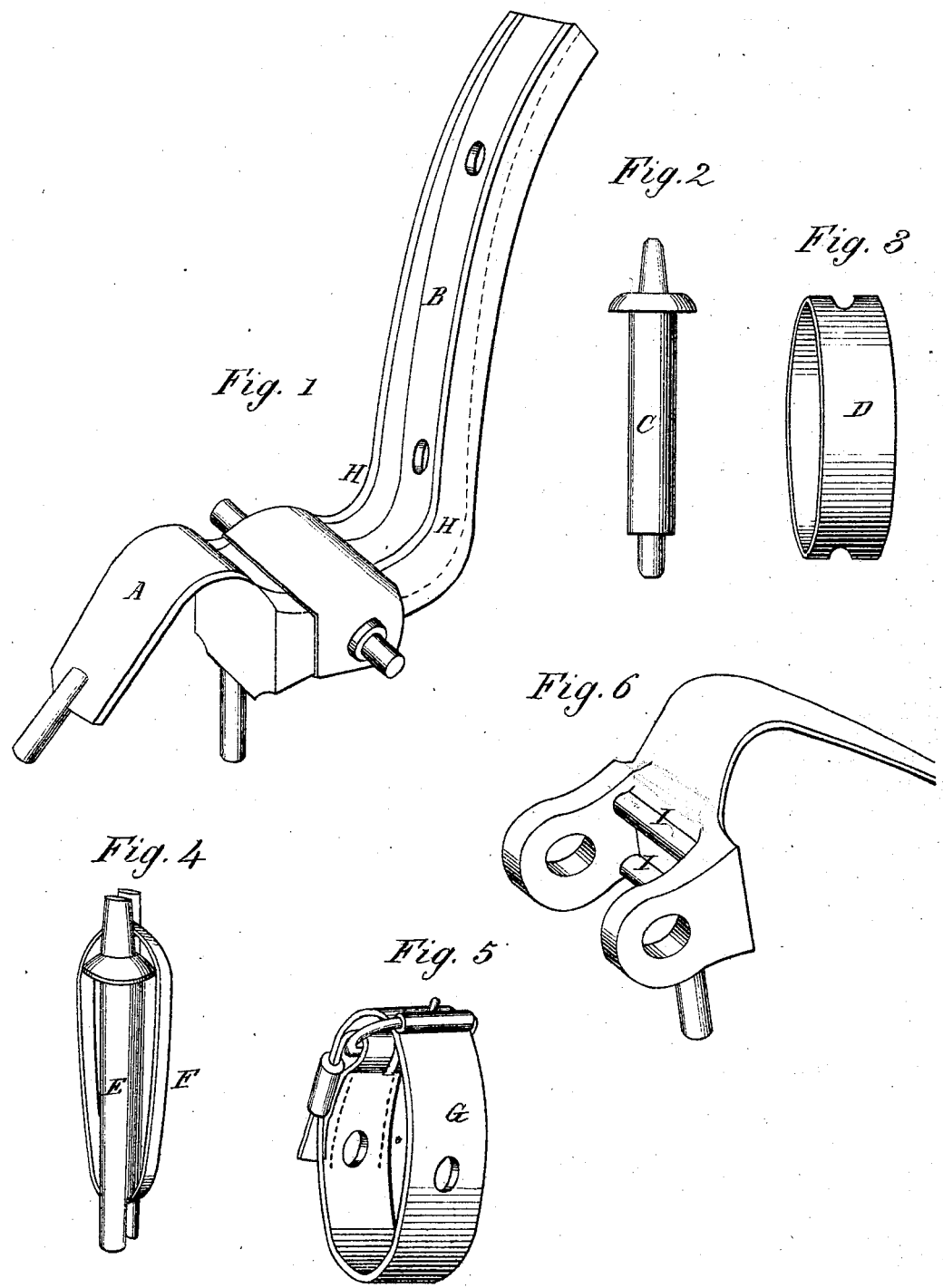
Witnesses
Marion Barnum
Hiram Barnum
Inventor
Seth Barnum

UNITED STATES PATENT OFFICE.

SETH BARNUM, OF WHITESTOWN, NEW YORK.

IMPROVEMENT IN WAGON-SHAFT COUPLINGS.

Specification forming part of Letters Patent No. 119,494, dated October 3, 1871.

*To all whom it may concern:*

Be it known that I, SETH BARNUM, of Whitestown, in the county of Oneida and State of New York, have invented certain Improvements in Wagon-Shaft Couplings, of which the following is a specification.

The first part of my invention relates to the mode of fastening couplings together; the object of this part of my invention being to secure the coupling from becoming detached when in use, and also so that it can be easily and readily detached whenever required. The second part of my invention relates to connecting the coupling with the shaft; the object being to secure the end of the shaft from becoming split, to lessen the sidewise strain on the bolts which hold them together, and to keep the shaft on a line with the coupling. The third part of my invention relates to holding a piece of rubber between the eye and clip of the coupling; the object being to hold it firmly, so that it cannot work out by the motion of the shaft. The fourth part of my invention relates to connecting the coupling with the iron strap which is used on the under side of the shaft; the object being to connect them firmly without welding the two together.

Figure 1 is an elevation of a coupling embodying my invention. Fig. 2 is a pin with a collar on it near one end and the ends made smaller than the body. Fig. 3 is an elastic rubber band with holes through it at each extremity. Fig. 4 is a pin and band made in another form; the pin has slots in each end, and the band clasps the pin lengthwise in the slots. Fig. 5 is a leather band with two holes through it opposite to each other. Fig. 6 is a section, showing two ribs on the slip and between the ears of the coupling.

The clip A, or that part which is connected with the axle when used, is left unfinished as when manufactured, but ready for the wagon-maker to fit to any desired shape axle required. The two ears on the front side of the clip A receive the eye of the part B, or that part which s connected with the shaft. The holes through he ears and eye receive the pin C; the collar on the pin stops it at the right place. The elastic rubber band D encircles the ears lengthwise of the pin, the holes through the band inclosing the ends of the pin. The ends of the pin are made smaller than the body to allow the holes to be small through the band. The spring of the band holds the pin to its place. The leather band G can be used in place of the rubber band D, the leather band being buckled around the ears and pin. The pin and band E and F are made in another form and for the same purpose as the pin and band C and D. The pin has slots in each end, and the band encircles the pin lengthwise in the slots. The flanges H H on the upper side and edges of the part B are so formed as to admit the shaft between them, and the bolt, being passed downward through the shaft and the part B, secures them firmly together, and effectually prevents the end of the shaft from becoming split, and relieves the sidewise strain on the bolts, and also keeps the shaft on a line with the coupling. The ribs I I are on the front side of the clip A, at the base of and between the ears. The coupling being detached, the rubber is placed against the ribs; the coupling is then attached, and the eye pressing against the rubber forces it against the ribs, which causes the ribs to indent it and hold it firm in its place. The flanges on the under side of the part B, as shown by the dotted line in Fig. 1, are formed to receive the end of the iron strap which is used on the under side of the shaft, between them, and the bolt being passed through the shaft, coupling, and strap, holds them all firmly together.

I claim as my invention—

1. The shaft-coupling, constructed, and the several parts connected together, substantially as and for the purpose hereinbefore set forth.
2. The bolt E and band F, arranged as shown.
3. The flanges H H upon the thill-iron B, as shown.

SETH BARNUM.

Witnesses:
MARION BARNUM,
HIRAM BARNUM.

(22)